3,304,202
WATER ACTIVATABLE DRY CHARGED BATTERY
Ahmad Sam, Circle Pines, Minn., assignor to Gould-National Batteries, Inc., a corporation of Delaware
Filed June 26, 1963, Ser. No. 290,850
3 Claims. (Cl. 136—6)

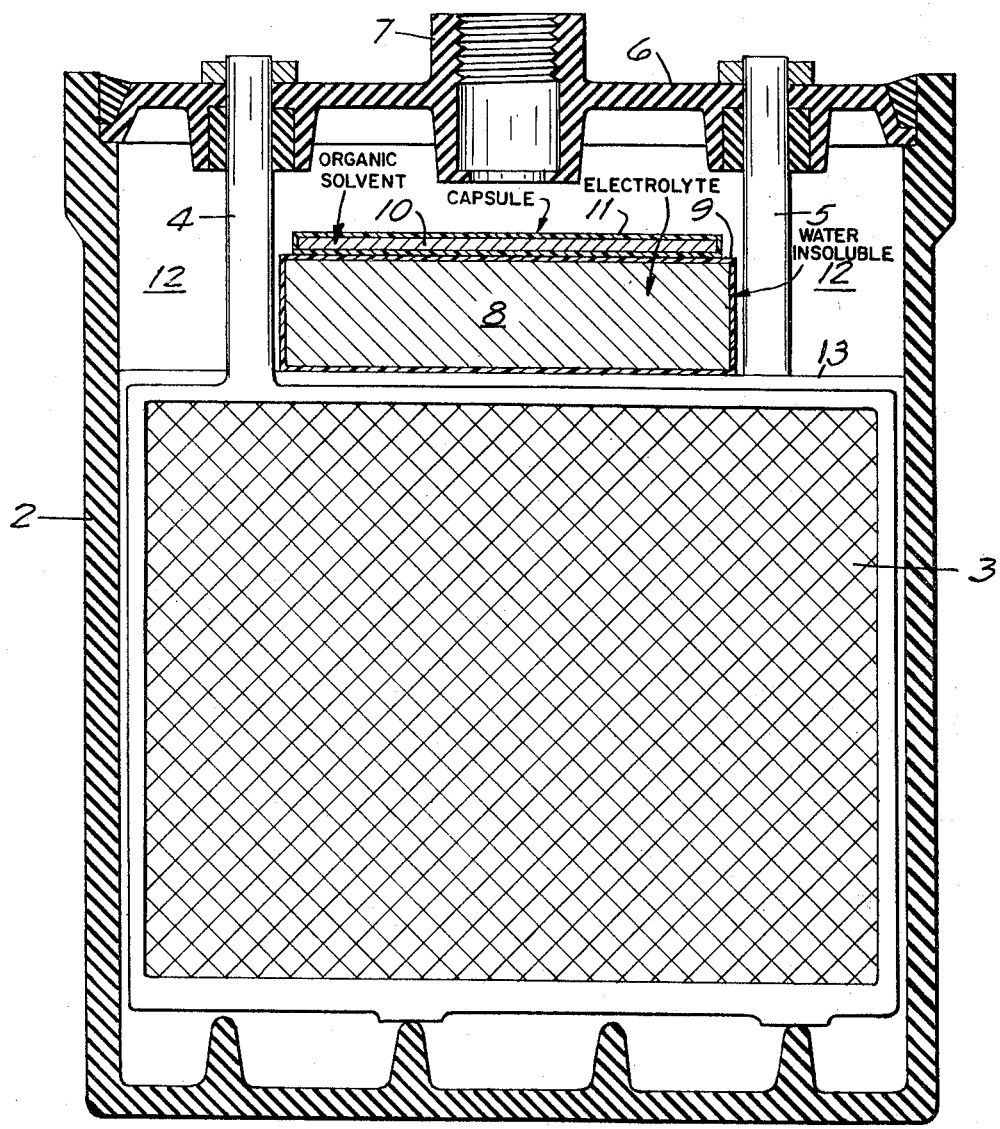

This invention relates to improvements in storage batteries of the dry charged type and particularly to an improved electrolyte therefor and means for confining a charge of concentrated electrolyte within a battery cell so that it may be activated by the addition of water.

Dry charged lead-acid batteries adapted to be activated by the addition of sulfuric acid are in wide use. Such batteries are usually activated at the place of sale after orders for the several batteries have been received. Under low temperature conditions the batteries do not activate readily and it has heretofore been customary to heat them by charging them for a considerable period of time in order to make them operative at their rated voltages. The resulting delays are often objectionable. Another disadvantage of such batteries rises from the fact that shipment of the liquid acid separately from the batteries is costly and its handling is difficult.

It is an object of the present invention to obviate such disadvantages by providing within each battery cell a measured quantity of a concentrated electrolyte in a container adapted to be ruptured or disintegrated when water is supplied to the cell.

A further object is to provide an improved solid electrolyte comprising approximately 80% by weight of concentrated sulfuric acid and a stabilizer or carrier consisting of about 20% of magnesium sulfate and water. An adequate quantity of this solid electrolyte occupies a small space in the battery cell and is adapted to be activated to provide a liquid electrolyte of the required density by the addition of approximately three parts by weight of cold water to one part of the solid electrolyte.

Other objects will appear and be more fully pointed out in the following specification and claims.

The invention will be best understood by reference to the accompanying drawing which illustrates, somewhat schematically, a dry charged lead-acid type battery in vertical section, with a charge of concentrated electrolyte in a container positioned above the battery plates.

Referring to the drawing, a battery case of conventional type is indicated generally by the numeral 2. Positive and negative electrodes are indicated at 3, a positive terminal post at 4 and a negative terminal post at 5. A cell cover 6 has a filling neck 7 of common type formed integrally therewith. The filling neck 7 has an internally threaded upper end portion adapted to receive a vent plug (not shown).

A charge of concentrated acid electrolyte is indicated at 8 and is confined in a sealed thin walled container 9 which is insoluble in water. The container 9 may be rectangular, as shown, or may be a flexible bag. This container should be insoluble in water and non-reactive with the concentrated electrolyte contained therein, but soluble in organic solvents. It may be supported on the upper edges of plate separators 13 or on the electrode plates 3. A suitable solvent for the container 9 is indicated at 10 in a capsule 11 resting on the container 9. Examples of suitable materials for the container 9 are "Polyflex," an oriented polystyrene film, manufactured by Plax Corp., of Hartford, Conn., "Tenite" polyethylene, manufactured by Eastman Chemical Products, Inc., of Kingsport, Tenn., "Parafilm," manufactured by Marathon Division of American Can Company, rigid containers made of polystyrene, vinyl plastics or waxes. Examples of suitable organic solvents, indicated at 10, are benzene, toluene, petroleum ether, carbon tetrachloride and suitable mixtures of such solvents. Examples of commercially available water soluble materials for the capsule 11 are "Radel," a polyethylene oxide film manufactured by Union Carbide Corporation, of Wayne, N.J., "M-Aquafilm," a methyl cellulose film manufactured by Aquafilm Corporation of New York Ctiy, "Gelvatol" film D330, a polyvinyl alcohol manufactured by Shawinigan Resins Corporation, of Springfield, Mass., and "CWS PVA," a polyvinyl alcohol film manufactured by Mono-Sol Corporation, of Gary, Indiana. Such capsule materials are quickly dissolved in the water which is added to the battery when it is to be activated. The concentrated electrolyte 8 in its container 9 and solvent 10 in capsule 11 are shown in the space 12 above the plates 3 in the battery cell. The container 9 and capsule 11 may be so placed before the top of the cell is closed by the cover 6.

An organic solvent, e.g., carbon tetrachloride, having a specific gravity greater than one may be used in the capsule 11 resting on the container 9. When the capsule is dissolved the solvent settles on the container 9 and causes it to rupture or disintegrate, thereby admitting water to the acid 8 when the battery is activated. As an alternative, the solvent in the capsule 11 may be a liquid having a specific gravity less than one, e.g., on the order of 0.98–0.99 gram per cc. When such low density solvent is used the capsule containing it may be placed on the cell units beneath the container 9 or above it in the space 12.

The electrolyte in the container 9 may be sulfuric acid in concentrated liquid form or in the form of a paste or jell. My tests have shown, however, it is advantageous to use my improved solid electrolyte comprising the reaction product of concentrated sulfuric acid and magnesium oxide. This solid electrolyte may be prepared as follows: To 98% sulfuric acid, pre-cooled to zero degrees centigrade, magnesium oxide (U.S.P. light weight) is added slowly in a ratio between 5 and 10 grams of magnesium oxide to 100 cc. of such concentrated sulfuric acid. Since the mixing is exothermic the magnesium oxide should be added to the acid gradually while stirring the mixture and cooling it to room temperature. The mixing vessel may be cooled by introducing Dry Ice or in a bath of ice and salt. When the reaction is complete measured quantities of the product in the form of a thick paste may be transferred to suitable thermoplastic containers and the containers may be sealed immediately. As an alternative the thick paste may be poured into suitable molds and kept in a desiccator. The reaction product solidifies in a period of 15 minutes to 2 hours, the solidification being expedited by cooling.

This concentrated acid product is so hygroscopic that upon exposure to atmosphere in the cells it absorbs water, becomes wet, and eventually forms a paste, in the cell compartments. Such a paste reacts with the negative plates in undesirable reactions and causes self discharge of the plates. To guard against this, I enclose the solid electrolyte in thermoplastic bags or containers which may be dissolved in suitable organic solvents as hereinbefore described.

To activate a battery containing a solid electrolyte in sealed plastic containers above the plates, the containers are ruptured by applying an organic solvent to them. With the capsule 11 in place in the battery cells, the water which is charged into each cell dissolves the capsule and allows the organic solvent contained therein to react with the container 9 and cause its rupture. In the alternative, the capsule 11 may be omitted, and the rupture of the electrolyte container 9 may be accomplished by spraying or injecting the solvent into the cell through the filling neck opening or by dropping one or more capsules containing the solvent through the opening, either before or after the addition of cold water to the cell when it is to be activated.

The organic solvent dissolves the wall of the electrolyte container within about five minutes, and when cold water is added the solid electrolyte dissolves in from 5 to 10 minutes to form an electrolyte of the required concentration. During the activating period the heat produced from the dissolution of the solid electrolyte in water evaporates the organic solvent. At the end of this period the battery is an activated condition and is ready for discharge. Any fragments of the plastic container that may remain in the cells do not interfere with the performance of the battery.

In a dry charged battery of 50 ampere hour capacity, 12 volt, 6 cell type, about 360 grams of solid electrolyte having a total volume of 190 cc. may be placed in each cell. When such a battery is to be activated, approximately 540 cc. of water at a temperature from 32 degrees F. to 50 degrees F. may be added to yield an electrolyte in the cell having the same concentration of sulfuric acid as an ordinary battery electrolyte having a specific gravity of 1.250. The dissolution of the solid electrolyte requires between 5 and 10 minutes and the temperature of the solution rises to 110–130 degrees F. upon the completion of the dissolution. The solid electrolyte used in this and the following tests was the reaction product resulting from mixing MgO with $H_2SO_4$ in the ratio of 1 gram of MgO to 10 cc. of $H_2SO_4$.

Further examples of the volumes and weights of the solid electrolyte and the proportional amounts of water needed to dissolve the solid and yield electrolyte of different concentrations of free sulfuric acid are presented in Table I as follows:

TABLE I

| Sp. gr. of equivalent electrolyte | Vol. of solid electrolyte, cc. | Weight of solid electrolyte, gm. | Vol. of water, cc. |
|---|---|---|---|
| 1.200 | 13.1 | 25.4 | 50 |
| 1.225 | 15.4 | 30.9 | 50 |
| 1.250 | 17.8 | 37.7 | 50 |
| 1.275 | 20.5 | 39.8 | 50 |
| 1.300 | 22.5 | 44.1 | 50 |

*Comparative tests*

Five 50 a.h. 12 volt batteries with solid electrolyte in the several cells were discharged at 150 amps against two control cells of the same size. These cells were all at room temperature of 75 degrees. About 680 cc. of 1.250 specific gravity $H_2SO_4$ were used as the electrolyte of each control cell and about 540 cc. of cold water was added to the several experimental cells containing the amounts of solid electrolyte indicated in Table I above. Discharge of each battery was started about 20 minutes after addition of liquids and the temperature of control cells was about 85 degrees F. at the start of the discharge, whereas the temperature of the experimental cells had risen to 110–130 degrees F. as the result of the dissolution of the solid $H_2SO_4$. The discharge capacity and the amounts of solid electrolyte for the several cells of the experimental batteries thus discharged are shown in Table II as follows:

TABLE II

| Control cells | | Experimental cells | |
|---|---|---|---|
| Amount of electrolyte, cc. | Capacity, ampere-hour | Amount of electrolyte, gm. | Capacity, ampere-hour |
| 680 | 9.21 | 320 | 9.21 |
| 680 | 8.67 | 320 | [1] 0 |
| | | 320 | [2] 7.46 |
| | | 320 | 8.17 |
| | | 360 | 8.06 |

[1] The solid electrolyte was placed at the bottom of the cell under the element.
[2] 1/3 of the solid electrolyte was introduced to the bottom of the cell under the elements.

Two 50 a.h. 12 volt batteries were made of fresh dry charged plates, one, the experimental battery, had solid electrolyte in the cell compartments above the plates and the other, the control battery, was a regular dry charged battery. Both of these batteries were cooled to 30° F., then the experimental battery with solid electrolyte was activated by addition of iced water and the control battery by addition of 1.250 $H_2SO_4$ cooled to 30° F. Comparative test results are shown in Table II as follows:

TABLE III

| Specification | Control Battery | Experimental Battery |
|---|---|---|
| 1. Temperature after 10 min. activation, °F | 42 | 130 |
| 2. Open circuit voltage after 10 min. activation | 12.00 | 12.38 |
| 3. 5 sec. voltage at 150 a. discharge | 3.70 | 9.51 |
| 4. Min. discharge at 150 a. to cut-off voltage | 0.00 | 1.17 |
| 5. Temp. after 10 min. charge at 30 a., °F | 77 | 141 |
| 6. Open circuit voltage after 10 min. charge | 14.05 | 13.81 |
| 7. 5 sec. voltage under 150 a. discharge | 10.10 | 10.18 |
| 8. Min. discharged at 150 a. to 9 v. cut-off voltage | 3.25 | 2.73 |
| 9. Total min. discharge at 150 a | 3.25 | 3.90 |

As indicated in the foregoing table, ten minutes after the addition of iced water, the experimental battery had a temperature of 130° F., an open circuit voltage of 12.38 volts and a closed circuit voltage of 9.51 volts for five seconds. When discharged at 150 amps, it ran for 1.17 minutes to a terminal voltage of 9.00. In comparison, the control battery had a temperature of 42° F. and closed circuit voltage of 3.7 volts ten minutes after addition of the electrolyte. After 5 seconds of discharge the terminal voltage of the control battery dropped to zero, whereas the experimental battery discharged for 1.17 minutes before the voltage dropped to 9 volts. Upon charging both batteries for 10 minutes at a 30 ampere rate the control battery became operative but the overall capacity of the experimental battery was greater than that of the control battery as shown by line 9 of Table III. Moreover, as shown by line 4, approximately one-third of the capacity of the experimental battery was available 10 minutes after the addition of liquid at which time the control battery had no capacity. Charging for 10 minutes was required to make the control battery fully operative.

These tests indicate that although there may be a slight loss of cell capacity as a result of the presence of the carrier remaining in the cell from the solid electrolyte, the advantages of the latter far outweigh the insignificant loss of capacity in that the time required for activation of the solid electrolyte is greatly reduced as compared to the time required to activate an ordinary dry charged battery with liquid sulfuric acid. This is of particular importance in cold weather. Other advantages are derived from the use of encapsulated electrolyte in the cells. These include reduction of the cost of transportation resulting from the reduction of the weight and volume of the materials needed for activation of dry charged batteries.

In another series of tests using encapsulated solvent and electrolyte, a mixture of carbon tetrachloride and petroleum ether having specific gravity of 0.98–0.99 was used as a solvent. From 2 to 5 cc. of this solvent enclosed in a water soluble capsule was enough for the activation of each cell of a 12-volt, 50-ampere-hour battery ten minutes after addition of water. A water soluble capsule for this solvent, made from "Radel," 0.002 inch thick was placed on the battery elements of each cell and an organic soluble container made of "Polyflex," 0.002 inch thick or of "Parafilm," 0.005 inch thick was supported on each capsule of organic solvent. When the capsules were dissolved in the activating water the organic solvent formed a layer around each electrolyte container, causing the rupture and dissolution of the container from all directions. Such tests were conducted using both solid and liquid $H_2SO_4$ containing 80–90% by weight $H_2SO_4$.

It was observed that whether the concentrated sulfuric acid in the container 9 is in a solid, liquid or paste state its sealed container excludes all moisture and prevents the absorption of water in the hygroscopic material even when stored for long periods of time either outside of or within the dry charged batteries. The concentrated sulphuric acid in the container 9 is, technically, the solute component of the electrolyte.

The present invention is not limited to the provision of concentrated electrolyte in battery cells of the lead-acid type. Alkaline type batteries, e.g., silver-zinc, silver-cadmium, nickel-iron and nickel-cadmium batteries may be provided with concentrated alkaline electrolyte. The arrangement of the plates, electrolyte container, and the water soluble capsule in such alkaline batteries may be generally the same as that hereinbefore described, except that the electrolyte comprises concentrated potassium hydroxide instead of concentrated sulfuric acid. When water is added to an alkaline battery cell containing an electrolyte container and solvent capsule, the water soluble capsule is dissolved, the organic solvent from the capsule causes the rupture of the electrolyte container and a solution of electrolyte fills the cell to the required depth. The problems of transportation and handling of alkaline batteries are the same as those of lead-acid batteries except that the alkaline batteries may be shipped dry, either charged or uncharged. The procedure for activation of charged and uncharged alkaline batteries is the same except that the uncharged batteries should be charged after activation.

My improved solid sulfuric acid product has other uses in addition to that of an electrolyte. Examples are in oil well drilling, and transport of sulfuric acid for chemical processes where its solid or semi-solid state, coupled with high concentration, are of value.

I claim:
1. In combination in a lead-acid storage battery having a casing enclosing electrode plates and defining a space for electrolyte extending above said plates, a charge of electrolyte concentrate confined in said space in a sealed container, the material of said container being insoluble in water and non-reactive with said concentrate and soluble in an organic solvent, and a capsule containing said organic solvent for said container in said casing and disposed adjacent to said container, the material of the walls of said capsule being water-soluble.

2. A combination in accordance with claim 1 in which said material of the capsule walls is selected from the group consisting of polyethylene oxide, polyvinyl alcohol and methyl cellulose.

3. A combination in accordance with claim 1 in which said material of the container is selected from the group consisting of polystyrene, vinyl plastics, waxes and "Parafilm."

References Cited by the Examiner
UNITED STATES PATENTS

| | | | |
|---|---|---|---|
| 574,417 | 1/1897 | Harris et al. | 136—154 |
| 2,580,414 | 1/1952 | Duffy | 206—84 |
| 2,718,539 | 9/1955 | Bradshaw et al. | 136—83 |
| 2,778,754 | 1/1957 | Shorr | 136—137 |
| 3,067,275 | 12/1962 | Solomon | 136—153 |
| 3,139,356 | 6/1964 | Tsuji | 136—90 |

FOREIGN PATENTS 507,035   6/1938   Great Britain.

OTHER REFERENCES

Blum: Transactions of the Electrochemical Society, vol. 66, 1934, page 367.

Jones: Inorganic Chemistry, 1947, pages 227 and 412.

Marsh: Electrical World and Engineer, vol. 39, No. 23, article titled "The Possibilities for a Light Weight Storage Battery," June 7, 1902.

Vinal: "Storage Batteries," 4th edition, chapter 9.

WINSTON A. DOUGLAS, *Primary Examiner.*

MURRAY TILLMAN, B. J. OHLENDORF,
*Assistant Examiners.*